Patented Oct. 15, 1929

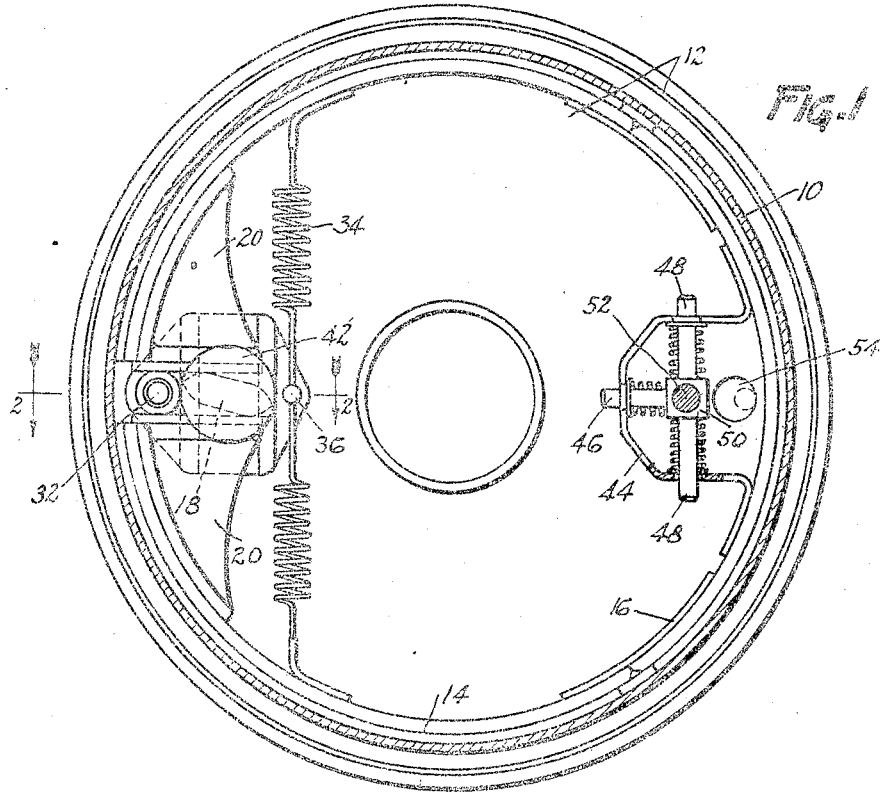
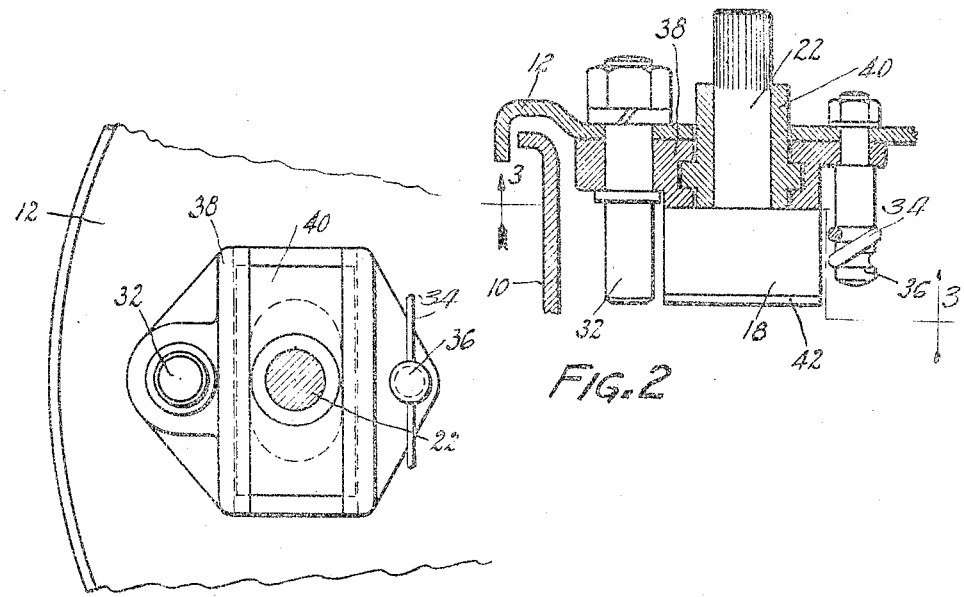

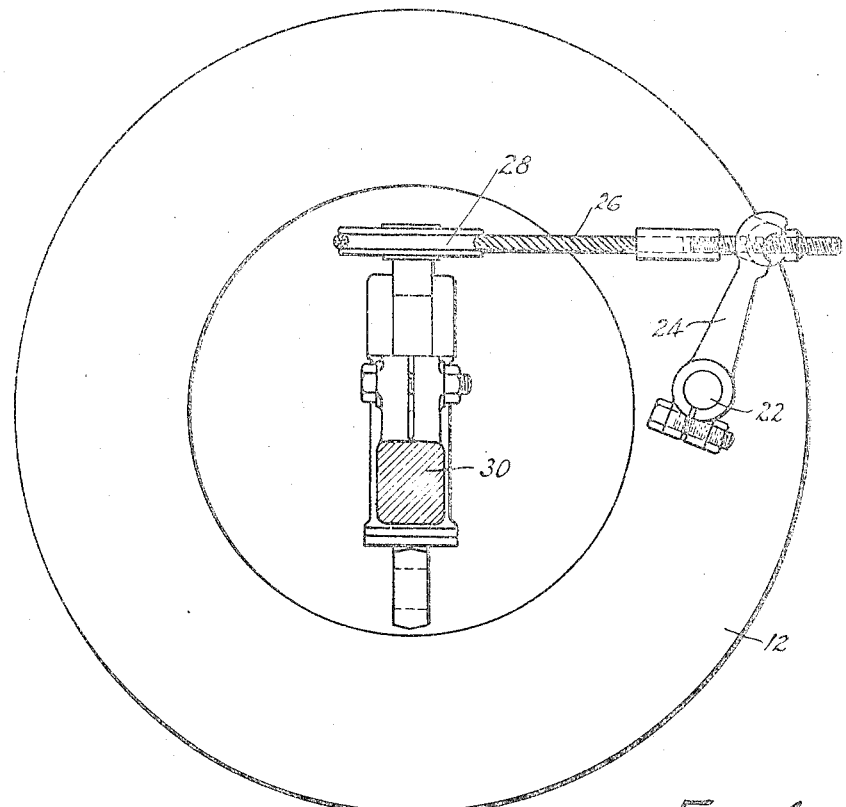

1,731,384

UNITED STATES PATENT OFFICE

LUDGER ELIZE LA BRIE, OF SOUTH BEND, INDIANA, ASSIGNOR TO BENDIX BRAKE COMPANY, OF CHICAGO, ILLINOIS, A CORPORATION OF ILLINOIS

BRAKE

Application filed August 24, 1925. Serial No. 51,953.

This invention relates to brakes, and is illustrated as embodied in a front wheel automobile brake of the internal expanding double-wrapping band type. An object of the invention is to secure adequate control of the friction device of the brake by easily-assembled and inexpensive parts.

One feature of the invention relates to operating the brake by means of spreading means, shown as a cam, carried by a slidably arranged bracket. In one desirable arrangement the bracket has a tongue-and-groove connection with an adjacent stationary member, shown in the drawings fastened to the backing plate by the brake anchor and by a post to which the brake-releasing spring is secured. I prefer to position the ends of the friction device laterally by confining them between this bracket and a flange on the cam.

Another feature of the invention relates to positioning the friction device when the brake is released by three springs and confined between a stationary member and the three sides of a loop carried by the friction device.

The above and other objects and features of the invention, including various novel combinations of parts and desirable particular constructions, will be apparent from the following description of one illustrative embodiment shown in the accompanying drawings, in which:

Fig. 1 is a vertical section through the brake just inside the wheel;

Fig. 2 is a partial horizontal section on the line 2—2 of Fig. 1, showing the cam mounting;

Fig. 3 is a vertical section on the line 3—3 of Fig. 2, showing the slidable bracket carrying the cam; and Fig. 4 is a diagrammatic vertical section through the front axle, looking outwardly at the brake, and showing one manner of operating the brake.

The brake shown includes a drum 10, and a backing plate 12, and enclosed between them a friction device 14 shown as a heavy semi-flexible band made in sections connected by leaf springs 16.

The band is expanded against the drum by a floating double cam 18 engaging thrust members 20 secured to the ends of the band, the cam being preferably integral with a shaft 22 having clamped at its end an arm 24 (Fig. 4) universally and adjustably jointed to the end of a cable 26 passing around a pulley 28 arranged just above the kingpin by which the wheel is swivelled to the axle 30.

The friction device 14 is of the floating type, one end or the other of which, according to the direction of drum rotation, anchors against torque-taking means such as a post 32 arranged between those ends. The device is contracted by a spring 34 fastened to a post 36.

A stationary member 38, fastened to the backing plate 12 by anchor 32 and post 36 as shown in Fig. 2, is grooved for a tongue-and-groove sliding connection with a bracket 40 in which shaft 22 is journalled, and which therefore carries the shaft and the cam in a manner permitting them to shift with the friction device. As will appear from a consideration of Fig. 4, the shifting of bracket 40 moves the joint between arm 24 and cable 26 along a line substantially tangent to an arc struck about a center at the point where cable 26 engages pulley 28. As the range of movement is very small, the application of the brake is not affected.

I prefer to position the free ends of the friction device 14 (i. e. the thrust members 20) laterally by confining them between bracket 40 and the stationary member 38, on the one side, and a flange 42 on cam 18 on the other side.

Approximately opposite the anchor 32, the friction device carries a loop 44 having openings in its three sides for a radial arm 46, and for opposite arms 48 extending along a chord of the drum, the openings for arms 48 being elongated slots. The three arms are carried by a stationary member 50 sleeved on a pin 52 secured to the backing plate 12. Preferably an eccentric adjustable stop 54, between member 50 and the friction device 14, determines the idle position of the friction device.

While one illustrative embodiment of the invention has been described in detail, it is not my intention to limit its scope to that particular embodiment, or otherwise than by the terms of the appended claims.

I claim:

1. A brake comprising, in combination, a drum, an expansible double-wrapping friction device within the drum, an inwardly projecting loop of substantial size carried by the friction device, a stationary member within the loop having opposite arms projecting through openings in the sides of the loop along a chord of the drum and having a third arm projecting radially of the drum inward through the loop, and three coil springs, each sleeved on one of said arms and confined between the loop and stationary member.

2. A brake comprising, in combination, a drum, a friction device engageable with the drum, a loop of substantial size carried by the friction device, a stationary member within the loop having opposite arms projecting through openings in the sides of the loop, and having a third arm projecting radially of the drum through the loop, and three coil springs, each sleeved on one of said arms and confined between the loop and stationary member.

3. A brake comprising in combination, a drum, a friction device engageable with the drum, a loop of substantial size carried by the friction device, a stationary member approximately in the center of the loop, and three springs confined between the three sides of the loop and said stationary member.

4. A brake comprising, in combination, a drum, a friction device engageable with the drum, a loop of substantial size carried by the friction device, a stationary member approximately in the center of the loop, three springs confined between the three sides of the loop and said stationary member, and a stop inside said loop between the friction device and the stationary member and engaged by the friction device when the central spring moves the friction device away from the drum.

5. A brake comprising, in combination, a drum, a friction device engageable with the drum, a loop of substantial size carried by the friction device, a stationary member approximately in the center of the loop, three springs confined between the three sides of the loop and said stationary member, and an adjustable eccentric stop inside said loop between the friction device and the stationary member and engaged by the friction device when the central spring moves the friction device away from the drum.

6. A brake comprising, in combination, a drum, a floating friction device within the drum, torque-taking means between the ends of the friction device, a floating cam between the ends of the friction device, a shiftable bracket supporting the cam and means including the bracket and a flange carried by the cam for laterally positioning the ends of friction device.

7. A brake comprising, in combination, a drum, a floating friction device within the drum, torque-taking means engageable by the friction device in either direction of drum rotation, a floating cam between the ends of the friction device, a shiftable bracket supporting the cam, and means including the bracket and a flange carried by the cam for laterally positioning the ends of the friction device.

8. A brake comprising, in combination, a drum, a friction device engageable with the drum and anchoring at one end when the drum is turning in one direction and at the other end when the drum is turning in the other direction, a stationary member adjacent the ends of the friction device, a bracket having a tongue-and-groove sliding joint with the stationary member, and a spreading device carried by the bracket and engaging the ends of the friction device and shiftable with the bracket as the friction device anchors at one end or the other.

9. A brake comprising, in combination, a drum, a friction device engageable with the drum, a stationary member adjacent the ends of the friction device, a bracket having a tongue-and-groove sliding joint with the stationary member, and a spreading device carried by the bracket and engaging the ends of the friction device and shiftable with the bracket to center the spreading device.

10. A brake comprising, in combination, a drum, a backing plate, a friction device enclosed between the drum and backing plate, a stationary member secured to the backing plate, a spreading device acting on the friction device, and a bracket carrying the spreading device and having a tongue-and-groove connection with the stationary member.

11. A brake comprising, in combination, a drum, a backing plate, a floating friction device enclosed between the drum and backing plate, torque-taking means between the ends of the friction device and engaged by one of said ends when the drum is turning in one direction and by the other end when the drum is turning in the other direction, a stationary member secured to the backing plate by means including said means, a bracket movably supported by the stationary member, and spreading means carried by the movable bracket and acting on the friction device.

12. A brake comprising, in combination, a drum, a backing plate, a floating friction device enclosed between the drum and backing plate, torque-taking means between the ends of the friction device and engaged by one of said ends when the drum is turning in one direction and by the other end when the drum is turning in the other direction, a stationary members secured to the backing plate by means including said means, a bracket having a tongue-and-groove connection with the stationary member, and spreading means carried by the movable bracket and acting on the friction device.

13. A brake comprising, in combination, a drum, a backing plate, an expansible floating friction device enclosed between the drum and backing plate, a spring for contracting said device, a post carried by the backing plate and to which the spring is connected, torque-taking means between the ends of the friction device, a stationary member fastened to the backing plate by the means and said post, and a spreading device acting on the friction device and movably carried by the stationary member.

14. A brake comprising, in combination, a drum, a backing plate, an expansible friction device enclosed between the drum and backing plate, a spring for contracting said device, a post carried by the backing plate and to which the spring is connected, torque-taking means between the ends of the friction device, a stationary member fastened to the backing plate by the means and said post, a bracket slidably supported by the stationary member, and a spreading device acting on the friction device and carried by the bracket.

15. A brake comprising, in combination, a drum, torque-taking means, a floating friction device engaging said means at one end when the drum is turning in one direction and at the other end when the drum is turning in the opposite direction, a stationary member, a bracket movably mounted on said member, and a floating cam carried by the bracket between the ends of the friction device which has a flange acting to position the ends of the friction device laterally, the opposite side of the device engaging both the bracket and the stationary member and positioned laterally thereby.

16. A brake comprising, in combination, a drum, a friction device within the drum, a stationary member adjacent the ends of the friction device, a bracket movably mounted on the stationary member, a shaft journalled in the bracket, and a floating cam between the ends of the friction device movably carried by the shaft and which has a flange, the ends of the friction device being confined laterally by said flange on one side and jointly by the bracket and the stationary member on the other side.

17. A brake comprising, in combination, a drum, a support, a friction device engageable with the drum, an integral cam and shaft arranged with the cam between the ends of the friction device, and a slidably mounted bracket having tongue-and-groove connection with the support and carrying the shaft, the cam having a flange and the ends of the friction device being confined laterally between the flange and the bracket.

18. A brake comprising, in combination, a drum, a floating friction device engageable with the drum, torque-taking means engageable by either end of the friction device, an integral cam and shaft arranged with the cam between the ends of the friction device and a movably mounted bracket carrying the shaft, the cam having a flange and the ends of the friction device being confined laterally between the flange and the bracket.

19. A brake having a floating operating cam, a stationary member, and a bracket carrying the cam and having tongue-and-groove connection with the stationary member.

20. A brake comprising, in combination, a drum, a backing plate, friction means within the drum, applying means for the friction means including a shaft extending through the backing plate, supporting parts rotatably supporting the shaft and arranged adjacent the backing plate, and anchoring means taking the braking torque from one part of the friction means when the drum is turning in one direction and from a different part of the friction means when the drum is turning in the other direction and which anchoring means secures the supporting parts to the backing plate.

21. A brake comprising, in combination, a drum, a backing plate, friction means within the drum, applying means for the friction means including a shaft extending through the backing plate, supporting parts rotatably supporting the shaft and arranged adjacent the backing plate, and anchoring means for the friction means arranged to secure the supporting parts to the backing plate.

22. A brake backing plate having a shaft-supporting bracket secured thereto by torque-taking brake anchorage means.

23. A brake backing plate having a shaft-supporting bracket secured thereto by at least one torque-taking fixed anchorage post.

In testimony whereof I have hereunto signed my name.

LUDGER ELIZE LA BRIE.